United States Patent

[11] 3,581,608

| [72] | Inventor | William J. Baker |
| | | Reed City, Mich. |
| [21] | Appl. No. | 874,179 |
| [22] | Filed | Nov. 5, 1969 |
| [45] | Patented | June 1, 1971 |
| [73] | Assignee | Gardner-Denver Company |
| | | Quincy, Ill. |

[54] CUTTING AND STRIPPING APPARATUS FOR INSULATED CONDUCTOR WIRE
8 Claims, 8 Drawing Figs.

| [52] | U.S. Cl. | 81/9.5 |
| [51] | Int. Cl. | H02g 1/12 |
| [50] | Field of Search | 81/9.5 (M), 9.5 (A), 9.51; 83/564; 7/14.1; 30/90.1, 91.1 |

[56] References Cited
UNITED STATES PATENTS

| 1,632,004 | 6/1927 | Hampton | 83/564 |
| 3,002,408 | 10/1961 | Schwalm | 81/9.51 |
| 3,103,837 | 9/1963 | Allen et al. | 81/9.5(M) |
| 3,403,441 | 10/1968 | Eubanks | 81/9.51X |

*Primary Examiner*—Robert C. Riordon
*Assistant Examiner*—Roscoe V. Parker, Jr.
*Attorney*—Michael E. Martin ABSTRACT: A cutting and insulation stripping apparatus for electrical conductor wire adapted to mount on a portable conductor wrapping tool. The apparatus includes a frame pivotally supporting a pair of wire cutting blades and a pair of insulation cutting and stripping blades. Both pair of blades are operable to be engaged by an elongated cam shaft to which is attached an operating lever whereby a conductor wire may be simultaneously severed and have its insulation cut at a predetermined distance from the severed end. The insulation cutting blades overlap each other in the closed position to assure a circumferential cut of insulation around the wire. The insulation cutting blades are also operable to strip the cut insulation from the wire as the severed end is withdrawn from the apparatus. The pair of wire cutting blades are movably mounted on the frame whereby various predetermined lengths of stripped wire may be cut.

PATENTED JUN 1 1971

3,581,608

SHEET 1 OF 2 inventor
William J. Baker by Michael E. Martin
agent

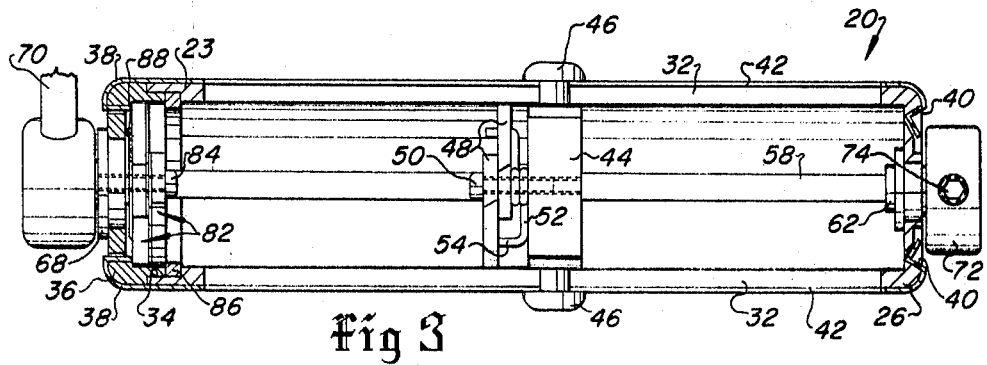

3,581,608

CUTTING AND STRIPPING APPARATUS FOR INSULATED CONDUCTOR WIRE

BACKGROUND OF THE INVENTION

Portable tools for making electrical connections by wrapping a portion of a conductor wire about a terminal in a succession of helical convolutions are known in the art of assembly of electrical equipment. Preparatory to making a wrapped electrical connection a predetermined length of wire must necessarily be stripped of its insulation prior to wrapping that portion about the terminal. Accordingly, for efficient operation in making wrapped connections it is desirable to have apparatus mounted directly on portable conductor wrapping tools operable to cut and remove insulation from a predetermined length of wire whereby the tool operator may then proceed to operate the tool to wrap the stripped portion of wire about the terminal.

Cutting and stripping apparatus for insulated conductor wire operable to be mounted on a portable wrapping tool is disclosed in U.S. Pat. No. 3,103,837 to E. L. Allen et al. It is desirable, however, in cutting and stripping apparatus to provide for interchangeable wire and insulation cutting blades in order to utilize the apparatus for different wire and insulation diameters and for replacing dull or broken blades. It is also desirable to provide for interchanging the hand of the operating lever without replacing a major portion of the apparatus itself. Furthermore, it is important in cutting insulation from electrical conductor wire that a clean and complete cut be made thereby avoiding irregular and torn insulation ends.

SUMMARY OF THE INVENTION

The present invention provides for cutting and insulation stripping attachment for portable conductor wrapping tools which is operable to sever and strip a predetermined length of insulation from a wire end. The invention provides for interchangeable wire and insulation cutting blades whereby broken or dull blades may be easily replaced and insulation cutting blades operable to accommodate different conductor wire diameters may be readily interchanged. The present invention also provides for adjustable stop means on a cutting and stripping attachment whereby the insulation cutting blades may be controlled to precisely cut through the conductor insulation without also cutting into the conductor wire for a wide range of wire and insulation diameters.

The present invention further provides for an insulation cutting and stripping apparatus in which the insulation cutting blades are operable to overlap one another in the closed or cutting position. With the cutting blades of the present invention the insulation is cut completely around the circumference of the wire thereby preventing splaying or tearing of the insulation which occurs during the stripping process if an incomplete cut is made. Furthermore, the circumferential cutting action assures a complete cut and relative ease of stripping of the more tenacious insulation materials of the fluoroplastic type.

BRIEF DESCRIPTION OF THE DRAWINGS

FIG. 3 is a longitudinal plan view partly in section of the cutting and stripping apparatus;

FIG. 5 is a section view taken along the line 5-5 of FIG. 2;

FIG. 6 is an end view of the cutting and stripping apparatus showing the cutting blade position stop;

FIG. 7 is a view of the insulation cutting blades in the overlapped closed position; and, FIG. 8 is a perspective view of an insulation cutter blade and support assembly.

DESCRIPTION OF THE PREFERRED EMBODIMENTS

Figure 1:
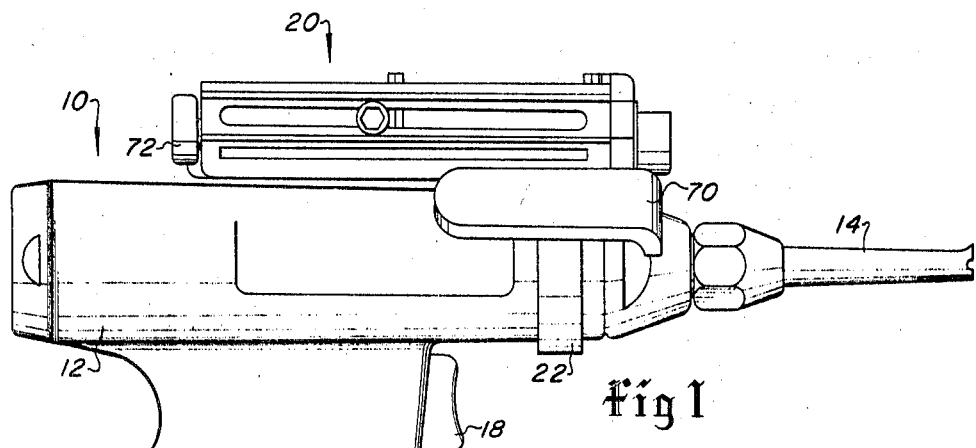
FIG. 1 is a longitudinal elevation of a conductor wrapping tool having the conductor wire cutting and insulation stripping apparatus of the present invention mounted thereon.

Referring to FIG. 1 a conductor wrapping tool, generally designated by the numeral 10, is known in elevation. The tool 10 is of a type well known in the art of making solderless wrapped electrical connections and includes a housing 12 enclosing a suitable motor which is operative to rotatively drive a conductor wrapping bit housed within a stationary sleeve 14. The tool 10 includes a grip 16 and an actuating trigger 18. The tool 10 is shown with a conductor wire cutting and insulation stripping apparatus 20 mounted on the tool housing 12 by means of a suitable clamp 22. The illustrated location of the apparatus 20 facilitates the ease with which the tool operator may prepare a conductor wire for the wrapping operation.

Figure 2:
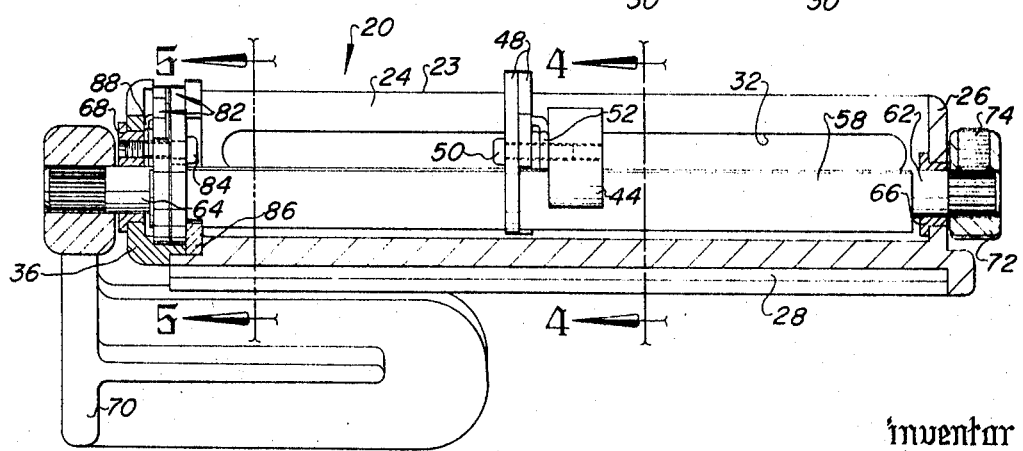
FIG. 2 is a longitudinal elevation, in section, of the cutting and stripping apparatus.

The construction of the improved cutting and stripping apparatus 20 is illustrated in FIGS. 2 through 8. Referring to FIGS. 2 and 3, the apparatus 20 includes an elongated frame 23 having a pair of sidewalls 24 and an integral closed end portion 26. The bottom of the frame 23 is formed to have a longitudinal slot 28 having reentrant flanges 30. The slot 28 is formed to receive a complementary projection on the clamp 22 or a similar projection formed on a wrapping tool housing whereby the cutting and stripping apparatus may be removably mounted on a tool. The frame 23 further includes elongated slots 32 formed in the sidewalls 24. The end of the frame 23 opposite the closed end 26 includes a recess 34 for receiving a support plate 36. The plate 36 is retained in position as shown in FIGS. 2 and 3 by a pair of elongated removable spring clamps 38 which extend the length of the frame 23 and are bent at 40 to hook over the end portion 26. The clamps 38 are formed with elongated slots 42 coinciding with the slots 32 in the frame 23.

Figure 4:
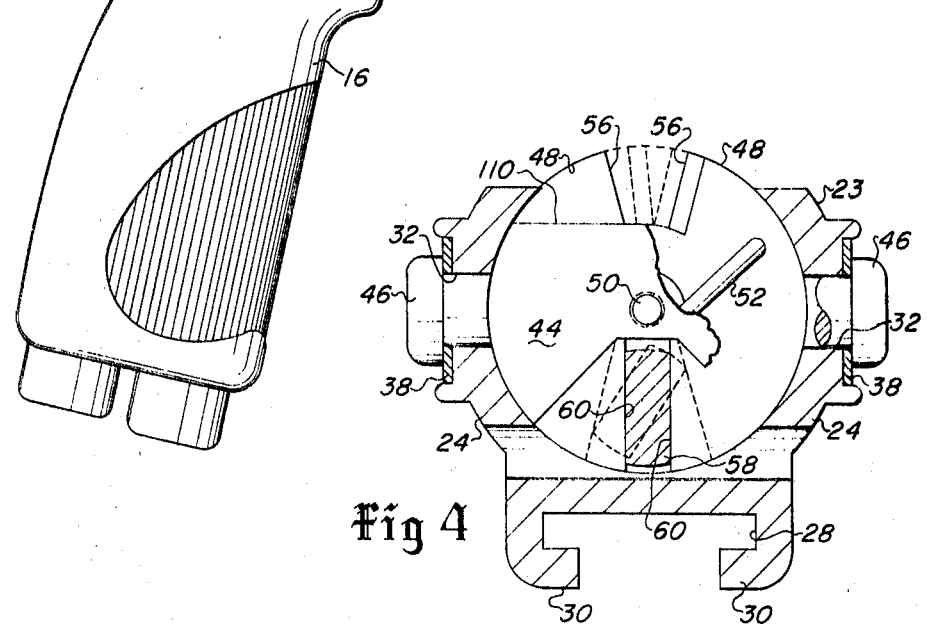
FIG. 4 is a section view taken along the line 4-4 of FIG. 2.

Referring to FIGS. 2, 3 and 4, a transverse support 44 is movably mounted between the sidewalls of the frame 23 by a pair of threaded fasteners 46 extending through the slots 42 and 32. The fasteners 46 includes head portions which bear against the clamps 38 which in turn are contiguous with the sidewalls 24 of the frame. The support 44 may be placed in any predetermined position throughout virtually the length of the frame 23 and secured in said position by tightening the fasteners 46. The support 44 comprises means for pivotally supporting a pair of wire cutting blades 48 which are pivotally mounted on a pin 50 having a portion threadedly engaged with the support 44. The blades 48 are mounted adjacent each other and are biased in the open position shown by the solid lines of FIG. 4 by a torsion spring 52 having projections 54 engaged with each blade. The blades 48 include cutting edges 56 which are operable to sever an insulated conductor wire upon being actuated to the closed position illustrated by the dashed lines in FIG. 4. The wire cutter blades 48 are operated to close by an elongated flat sided cam 58 operable to engage coacting surfaces 60 on the cutter blades. Referring to FIGS. 2 and 3 the cam 58 is rotatably journaled in the frame 23 at the respective cylindrical shaft portions 62 and 64 by bushings 66 and 68 which are mounted in the end portion 26 of the frame and on the plate 36, respectively. The cylindrical end portion 64 of the cam 58 includes serrations over which the hub of an operating lever 70 is nonrotatably secured. The opposite end of the cam 58 also includes a serrated portion of the cylindrical shaft 62 which extends through the frame end 26 and has a rotatably adjustable stop 72 secured thereon by means of a setscrew 74. Referring to FIG. 6, it may be seen that the stop 72 is formed to have projections 76 and 78 which are operable to engage the projection 80 on the frame end 26 to thereby limit the rotational movement of the cam 58. The stop 72 may be adjustably positioned on the shaft portion 62 to thereby change the radial position of the projections 76 and 78 with respect to cam 58 and limit the rotation movement of the cam for a purpose to be explained herein. The frame 23, support plates 36 and 44, bushings 66 and 68, lever 70 and the stop 72 may be suitably molded of one of a number of well-known plastic materials.

The conductor wire cutting and stripping apparatus 20 includes means for making a circumferential cut of the insulation from a circular conductor wire comprising a pair of insulation cutting blade and support assemblies 82. The insulation cutting blade assemblies are identical. They are reversely turned and positioned adjacent each other and pivotally mounted on a partially threaded pin 84 which is threaded into the bushing 68. The insulation cutting blade assemblies 82 are further retained in assembly with the apparatus 20 by a spring steel retaining ring 86 which is self-biased into a groove in the frame 23. The cutting blade assemblies are pivotally biased in the open position shown in FIG. 5 by a torsion spring 88, see FIG. 3, similar to the spring 52. Referring to FIG. 8, a blade assembly 82, shown in perspective, comprises a thin steel blade insert 90 sandwiched between support plates 92 and 94 and held in assembly by a screw 96 and a dowel pin 98. As may be seen in FIGS. 5, 7 and 8, the blade inserts 90 include arcuate notches 100 forming insulation cutting edges dimensioned to accommodate a specific wire gauge. Each cutting edge 100 is formed to cut the insulation through 180° around the circumference of the inner wire or conductor. The supports 94, accordingly, have concentric arcuate notches 102 dimensioned to guide, but not grip, the insulation when the blades are in the closed position. The notches 100 and 102 of the blade and support, respectively, are positioned with respect to the arcuate surface 104 on the supports 94 such that when an insulated conductor 106 (FIG. 5) is laid on the surface 104, the blades will operate to cut through the insulation only. The insulation cutting blade assemblies 82 are constructed to have cam surfaces 108 engageable with the cam 58 in a manner similar to the wire cutting blades whereby actuation of the cam 58 produces simultaneous cutting of the wire and the insulation at a predetermined distance from the severed end of the wire.

A particularly advantageous aspect of the present invention is illustrated in FIG. 7. The insulation cutting blades 90 are assembled to lie adjacent one another and are operable when closed to have the cutting notches 100 overlap each other to form a cylindrical cutting edge. The insulation surrounding a conductor wire is thereby circumferentially severed and the insulation remaining on the wire is not stretched or torn at the cut end when the portion to be removed is stripped from the wire. By providing cutting blades that overlap each other, as opposed to blades which merely abut one another in the closed position, there is no tendency to squeeze or splay the insulation and a complete circumferential cut is made to facilitate the removal of the insulation from the severed end of the wire.

As may also be appreciated from the drawings and the foregoing description, both the wire and insulation cutting blades may be readily interchanged if dulled or broken or if a change in wire gauge is required. Also, the pivotal mounting of both sets of blades with the actuating cam 58 positioned on the opposite side of the pivot from the cutting edges provides for the exertion of a powerful cutting action with only moderate force applied to the actuating lever 70.

In the operation of the cutting and stripping apparatus 20, a predetermined length of stripped wire is selected by positioning the movable wire cutter support 44 with respect of the insulation cutter assembly and tightening the fasteners 46 to hold the support in position. With both the wire and insulation cutter blade assemblies in their spring biased open position a length of insulated wire is laid on the surface 104 of the supports 94 and the surface 110 of the transverse support 44. Thereafter, the operator actuates the lever 70 which, through the cam 58, closes both sets of blades 48 and 82 simultaneously severing the wire and cutting through the insulation at a predetermined distance from the severed end. With the jaws held closed, the wire is pulled away from the apparatus at the insulation cutting end whereby the surface of the blades 90 immediately adjacent the arcuate notches 100 abuts the insulation and strips the same from that portion of the wire which extended between the insulation cutting blades 90 and the wire cutting blades 48. After completion of the insulation stripping operation, the operator releases the lever 70 whereby springs 52 and 88 bias the respective cutter blade assemblies in the open position wherein they are in position to cut and strip another conductor wire.

Due to the fact that the insulation cutting blades 90 are designed to overlap, the closing action of the blades must be limited by the adjustable stop 72 on the cam shaft 62 to prevent the blades from severing or cutting into the conductor wire proper. The stop 72 may be advantageously prepositioned on the shaft 62 to accurately limit the rotational movement thereof and accordingly the closing action of the blades 90. The stop 72 may be conveniently and accurately adjusted for different insulation cutter blades and wire gauges thereby eliminating the need for precision machined stops on the blade supports, for example.

I claim:

1. Wire cutting and insulation stripping apparatus adapted to mount on a portable conductor wire wrapping tool, said apparatus comprising:
   a. an elongated frame including means for attaching said apparatus to said tool;
   b. a pair of insulation cutting blades pivotally supported on said frame and operable to be in an open wire receiving position and a closed insulation cutting position;
   c. a pair of wire cutting blades pivotally supported on said frame a predetermined distance from said insulation cutting blades and operable to be in an open wire receiving position and a closed wire cutting position movable with respect to the other pair of said blades to vary said predetermined distance;
   d. an elongated cam rotatably mounted on said frame and engageable with each blade of said pair of wire cutting blades and said insulation cutting blades for simultaneously pivoting each of said blades from said open wire receiving position to said closed wire and insulation cutting position; and
   e. lever means mounted on said cam for operation of said cam to close said blades.

2. The invention set forth in claim 1 together with:
adjustable stop means mounted on said cam and including projection means engageable with complementary projection means on said frame whereby the rotational movement of said cam to close said pairs of blades may be controlled.

3. The invention set forth in claim 1 wherein:
said pair of wire cutting blades are movably supported on said frame and are operable to be adjusted with respect to said insulation cutting blades to vary the predetermined distance therebetween.

4. The invention set forth in claim 1 wherein:
each of said insulation cutting blades of said pair includes an insulation cutting edge formed thereon, said blades are pivotally supported adjacent each other, and said blades are operable to be pivoted to a position by said cam whereby said cutting edges on said blades overlap each other.

5. The invention set forth in claim 4 wherein:
said cutting edges on said insulation cutting blades are arcuate, and said cutting edges are operable in the overlapped position to make a circumferential cut through the insulation covering a cylindrical conductor wire.

6. The invention set forth in claim 4 wherein:
each of said insulation cutting blades comprises a blade assembly including a blade insert and blade support means, and said blade insert is removably attached to said support means.

7. The invention set forth in claim 1 wherein:
each of said wire cutting blades of said pair includes a cutting edge formed thereon, said blades are pivotally supported adjacent each other, and said blades are operable to be pivoted to a position by said cam whereby said cutting edges on said blades overlap each other.

8. The invention set forth in claim 1 wherein:
said pair of insulation cutting blades and said pair of wire cutting blades include biasing means engaged therewith and operable to bias said pairs of blades in the open wire receiving position.